US009346417B2

(12) United States Patent
Sitko

(10) Patent No.: US 9,346,417 B2
(45) Date of Patent: May 24, 2016

(54) AIRBAG ENGAGING PIVOTABLE TRIM PANEL

(71) Applicant: Nissan North America, Inc., Franklin, TN (US)

(72) Inventor: Jeffrey Sitko, Saline, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 14/504,834

(22) Filed: Oct. 2, 2014

(65) Prior Publication Data

US 2016/0096491 A1 Apr. 7, 2016

(51) Int. Cl.

| | |
|---|---|
| ***B60R 13/02*** | (2006.01) |
| ***B60R 21/213*** | (2011.01) |
| ***B60R 21/232*** | (2011.01) |
| *B60R 21/16* | (2006.01) |

(52) U.S. Cl.

CPC ........... *B60R 13/0275* (2013.01); *B60R 13/025* (2013.01); *B60R 21/232* (2013.01); *B60R 21/213* (2013.01); *B60R 2013/0287* (2013.01); *B60R 2021/161* (2013.01)

(58) Field of Classification Search

CPC .. B60R 13/0275; B60R 13/025; B60R 13/02; B60R 2013/0287; B60R 2021/161; B60R 21/232; B60R 21/213; B62D 25/04

USPC .................................. 280/730.2; 296/193.06

See application file for complete search history.

(56) References Cited

U.S. PATENT DOCUMENTS

| | | | |
|---|---|---|---|
| 3,779,595 | A | 12/1973 | Suzuki et al. |
| 5,454,589 | A | 10/1995 | Bosio et al. |
| 5,725,271 | A | 3/1998 | Patel et al. |
| 5,752,717 | A | 5/1998 | Galbraith et al. |
| 5,833,303 | A | 11/1998 | Kawai et al. |
| 5,839,756 | A | 11/1998 | Schenck et al. |
| 6,170,871 | B1 | 1/2001 | Goestenkors et al. |
| 6,296,269 | B1 | 10/2001 | Nagai et al. |
| 6,338,501 | B1 | 1/2002 | Heilig et al. |
| 6,431,583 | B1 | 8/2002 | Schneider |
| 6,431,584 | B1 | 8/2002 | Nagasawa et al. |
| 6,817,627 | B2 | 11/2004 | Galmiche et al. |
| 7,048,298 | B2 | 5/2006 | Arwood et al. |
| 7,108,316 | B2 | 9/2006 | Barvosa-Carter et al. |
| 7,125,045 | B2 | 10/2006 | Fuks et al. |

(Continued)

FOREIGN PATENT DOCUMENTS

| | | |
|---|---|---|
| EP | 0855313 B1 | 9/2002 |
| JP | 2002-187572 A | 7/2002 |

(Continued)

*Primary Examiner* — Keith Frisby

(74) *Attorney, Agent, or Firm* — Global IP Counselors, LLP

(57) ABSTRACT

A vehicle body structure includes a roof structure, a pillar structure extending below the roof structure, and an airbag mounted to and extending along the roof structure. The airbag is deployable from a stowed orientation to a deployed orientation. A trim panel is mounted to and extends along the pillar structure. The trim panel is disposed beneath the airbag when the airbag is in the stowed orientation, and the airbag overlays the trim panel when the airbag is in the deployed orientation. A trim deployment structure is connected to the pillar structure and is configured to pivot a trim panel about a pivot structure after deployment of the airbag to the deployed orientation such that the trim panel engages the deployed airbag to move the deployed airbag in an inboard direction.

20 Claims, 8 Drawing Sheets

31 22 34 11 57 59 58 60 13 35 30 48 49 40 33

(56) References Cited

U.S. PATENT DOCUMENTS

| | | | |
|---|---|---|---|
| 7,581,749 | B2 | 9/2009 | Robins |
| 2002/0190548 | A1 | 12/2002 | Ruel et al. |
| 2004/0251665 | A1 | 12/2004 | Kumagai |

FOREIGN PATENT DOCUMENTS

| | | | | |
|---|---|---|---|---|
| JP | 2005-335571 | A | | 12/2005 |
| JP | 2012236554 | A | * | 12/2012 |
| WO | 2004/065180 | A1 | | 8/2004 |

* cited by examiner

AIRBAG ENGAGING PIVOTABLE TRIM PANEL

BACKGROUND

1. Field of the Invention

The present invention generally relates to a vehicle body structure including a trim panel configured to engage a deployed airbag. More specifically, the present invention relates to a trim deployment structure configured to pivot a trim panel about a pivot structure to engage a deployed airbag.

2. Background Information

Passenger vehicles with windows are required to have airbags that deploy in response to an impact event. Accordingly, a need exists for inboard movement of a deployed airbag to provide earlier occupant contact.

SUMMARY

In view of the state of the known technology, one aspect of the present invention provides a vehicle body structure including a roof structure, a pillar structure extending below the roof structure, and an airbag mounted to and extending along the roof structure. The airbag is deployable from a stowed orientation to a deployed orientation. A trim panel is mounted to and extends along the pillar structure. The trim panel is disposed beneath the airbag when the airbag is in the stowed orientation, and the airbag overlays the trim panel when the airbag is in the deployed orientation. A trim deployment structure is connected to the pillar structure and is configured to pivot a trim panel about a pivot structure after deployment of the airbag to the deployed orientation such that the trim panel engages the deployed airbag to move the deployed airbag in an inboard direction Another aspect of the present invention provides a vehicle body structure including a roof structure, a pillar structure extending below the roof structure, and an airbag mounted to and extending along the roof structure. The airbag is deployable from a stowed orientation to a deployed orientation. A trim panel is mounted to and extends along the pillar structure. The trim panel is disposed beneath the airbag when the airbag is in the stowed orientation, and the airbag overlays the trim panel when the airbag is in the deployed orientation. A pivot structure pivotally secures the trim panel to the pillar structure. The pivot structure is positioned between an upper portion of the trim panel and a lower portion of the trim panel. A trim deployment structure is connected to the pillar structure and is disposed below the pivot structure. The trim deployment structure is configured to pivot the trim panel about the pivot structure after deployment of the airbag to the deployed orientation such that the bottom portion of the trim panel moves in an inboard direction and engages the deployed airbag to move the deployed airbag in the inboard direction.

Yet another aspect of the present invention provides a method of deploying a vehicle airbag assembly. An airbag is deployed from a stowed orientation in which the airbag is positioned adjacent a roof structure and above a pillar structure to a deployed orientation in which the airbag overlays a pillar trim panel. The deployed airbag is engaged with the pillar trim panel by pivoting the pillar trim panel with respect to the pillar structure to move the deployed airbag in an inboard direction of a vehicle.

BRIEF DESCRIPTION OF THE DRAWINGS

Referring now to the attached drawings which form a part of this original disclosure.

DETAILED DESCRIPTION OF EXEMPLARY EMBODIMENTS

Selected exemplary embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

Figure 1:
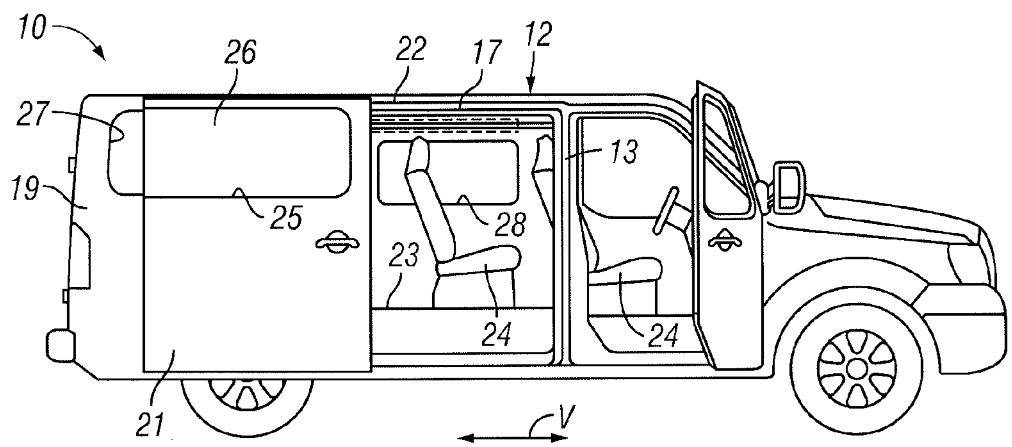
FIG. 1 is a side elevational view of a vehicle.

Referring initially to FIG. 1, a vehicle 10 including a plurality of airbags 11 is illustrated in accordance with a first exemplary embodiment. A description of the airbags 11 is provided following a description of the vehicle 10. In the depicted exemplary embodiment, the vehicle 10 is a commercial van configured to carry a plurality of passengers. However, it should be understood from the drawings and the description herein that the vehicle 10 can be any of a variety of vehicles that carry at least one passenger. More specifically, an airbag 11 can be provided in any location adjacent to a passenger seat, as described in greater detail below.

The vehicle 10 has a body structure 12 including, among other features, a plurality of pillar structures 13, 14, 15 and 16, roof rail structures 17 and 18, side panels 19 and 20, a sliding door 21, a roof structure 22 and a floor structure 23.

The pillar structures 13, 14, 15 and 16 all extend in an upright or vertical direction relative to the vehicle 10. The pillar structures 13 and 15 are B-pillars and the pillar structures 14 and 16 are C-pillars in the depicted exemplary embodiment. However, as will be understood from the description below of the airbag 11, the pillar structure 13 can be any one of the pillar structures within the vehicle 10, such as an A-pillar, one of the B-pillars, one of the C-pillars or a D-pillar.

Figure 2:
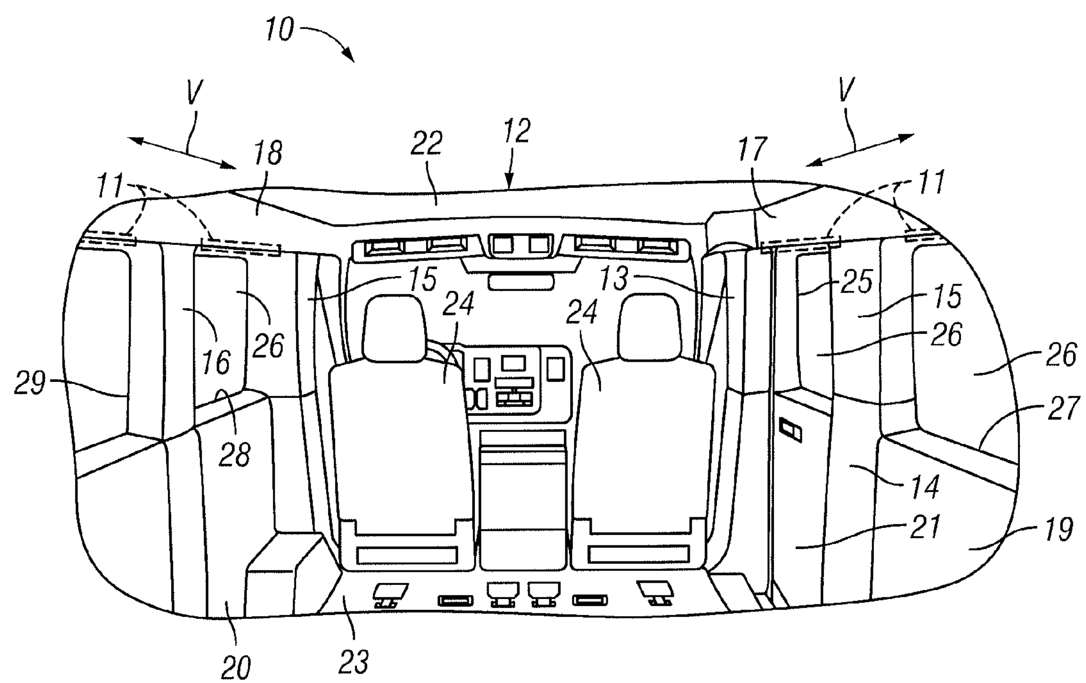
FIG. 2 is a rear perspective view of the vehicle of FIG. 1.
Figure 3:
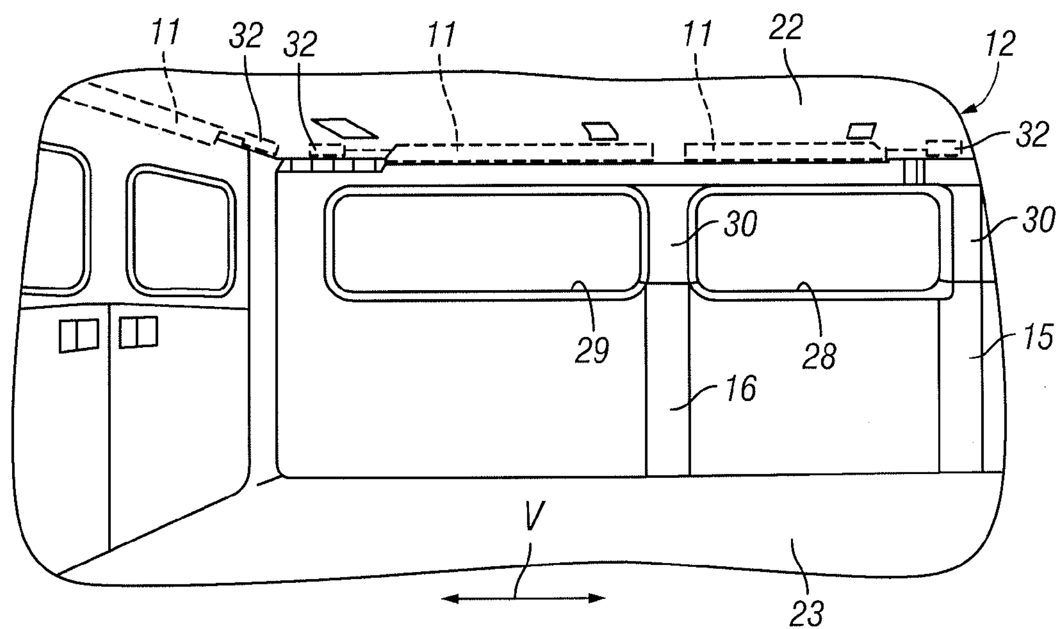
FIG. 3 is a side perspective view of the vehicle of FIG. 1.

The roof rail structures 17 and 18 extend in a vehicle longitudinal direction V, as labeled in FIGS. 1-3. More specifically, the roof rail structure 17 extends along a passenger's side of the vehicle 10 supporting the roof structure 22 above the pillar structures 13 and 15. Further, the pillar structures 13 and 15 are rigidly fixed by, for example, welding techniques to the roof rail structure 17. Similarly, the roof rail structure 18 extends along a driver's side of the vehicle 10 supporting the roof structure 22 above the pillar structures 14 and 16. Further, the pillar structures 14 and 16 are rigidly fixed by, for example, welding techniques to the roof rail structure 18. The roof structure 22 is rigidly fixed to the roof rail structures 17 and 18, by, for example, welding techniques. Because pillar structures, roof rail structures and roof structures are conventional vehicle features, further description is omitted for the sake of brevity.

The side panels 19 and 20 are fixed to respective ones of the pillar structures 13, 14, 15 and 16, and the roof rail structures 17 and 18 in a conventional manner, such as welding techniques. Because side panels are conventional vehicle features, further description is omitted for the sake of brevity.

The sliding door 21 is supported to the pillar structures 13 and 15, the roof rail structure 17 and the side panel 19 in a conventional manner for movement between an open position (FIG. 1) and a closed position (FIG. 2).

The floor structure 23 supports and is fixedly attached to the pillar structures 13, 14, 15 and 16 in a conventional manner. The floor structure 23 also supports a plurality of seats 24.

The sliding door 21 includes a window opening 25 with window glass 26 supported therein. Further, the side panels 19 and 20 further include window openings 27, 28 and 29 with window glass 26 supported therein. For example, the window opening 27 is located rearward of the pillar structure 14. The window opening 28 is located between the pillar structures 15 and 16, and the window opening 29 is located rearward of the pillar structure 16, in a conventional manner. The window glass 26 in the sliding door 21 is located between the pillar structures 13 and 14 with the sliding door 21 in the closed position.

Figure 4:
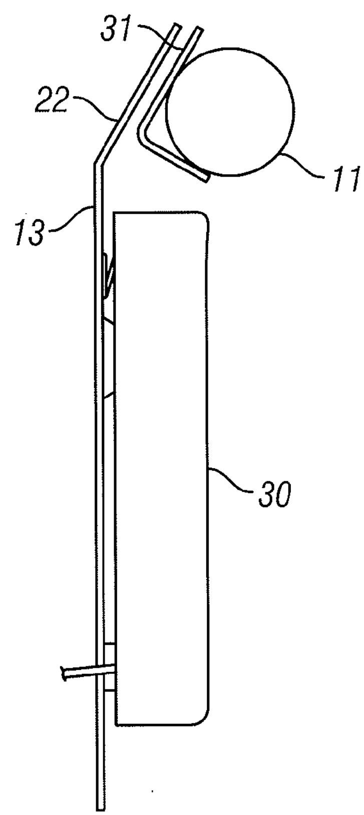
FIG. 4 is a rear elevational view of a trim panel in accordance with an exemplary embodiment of the present invention prior to airbag deployment.
Figure 16:
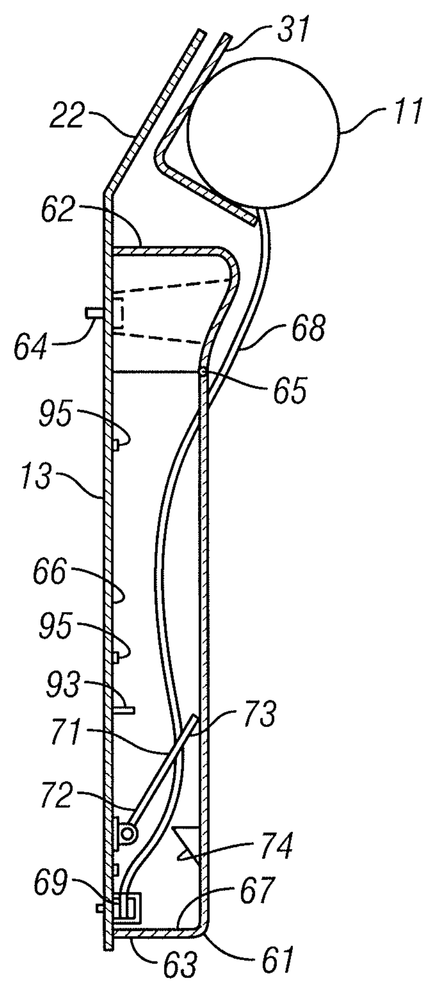
FIG. 16 a rear elevational view in cross-section of a trim panel in accordance with another exemplary embodiment of the present invention including a two-piece trim panel and a locking bar prior to airbag deployment.

There are a plurality of airbags 11 within the vehicle 10. Preferably, there is at least one airbag 11 located above each of the window openings and a corresponding trim panel 30 pivotally connected to the corresponding pillar structure 13, 14, 15 or 16. The trim panel 30 is preferably unitarily formed as a single member, as shown in FIG. 4. Alternatively, as shown in FIG. 16, the trim panel 61 is a two-piece member having a second part 63 pivotable with respect to a first part 62. For example, one of the airbags 11 is located above the sliding door 21 and hence above the window opening 25. The corresponding pivotable trim panel 30 is located along the pillar structure 13. Similarly, another one of the airbags 11 is located above the window opening 27. The corresponding pivotable trim panel 30 is located along the pillar structure 14. Yet another one of the airbags 11 is located above the window opening 28 and the corresponding pivotable trim panel 30 is located along the pillar structure 15. Still another one of the airbags 11 is located above the window opening 29 and the corresponding pivotable trim panel 30 is located along the pillar structure 16. It should be understood from the drawings and the description herein that at least one of the airbags 11 and corresponding pivotable trim panel 30 is installed adjacent to a window opening such that upon deployment the airbag 11 covers at least a portion of or all of the adjacent window opening and window glass disposed therein.

An exemplary embodiment of the present invention, as shown in FIG. 4, includes a pivotable trim panel 30 disposed beneath an airbag 11, which is fixed to the roof structure 22 above the window opening 25. The airbag 11 is shown in FIG. 4 in a stowed orientation. The airbag 11 is deployed in response to an impact event such that the airbag 11 inflates and moves to a deployed orientation as shown in FIGS. 5 and 6, and described in greater detail below.

Figure 5:
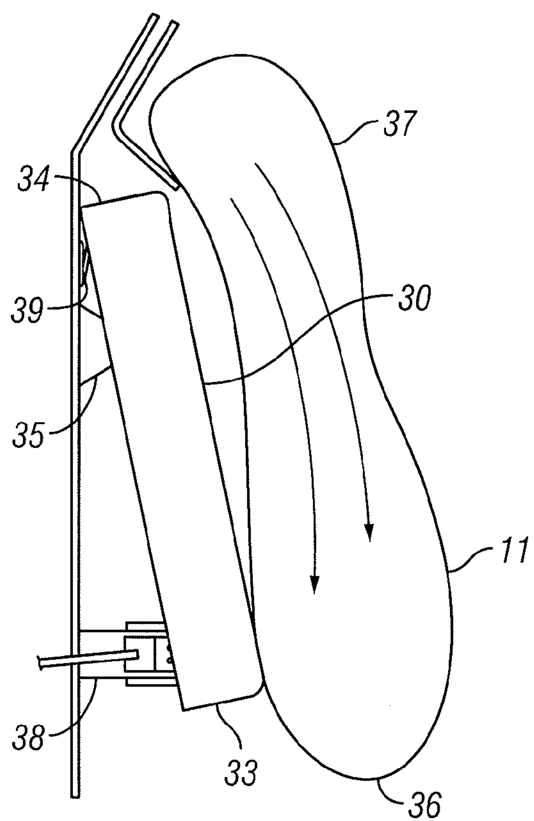
FIG. 5 is a rear elevational view of a trim panel of FIG. 4 with a bottom end pivoted inboard after airbag deployment.
Figure 6:
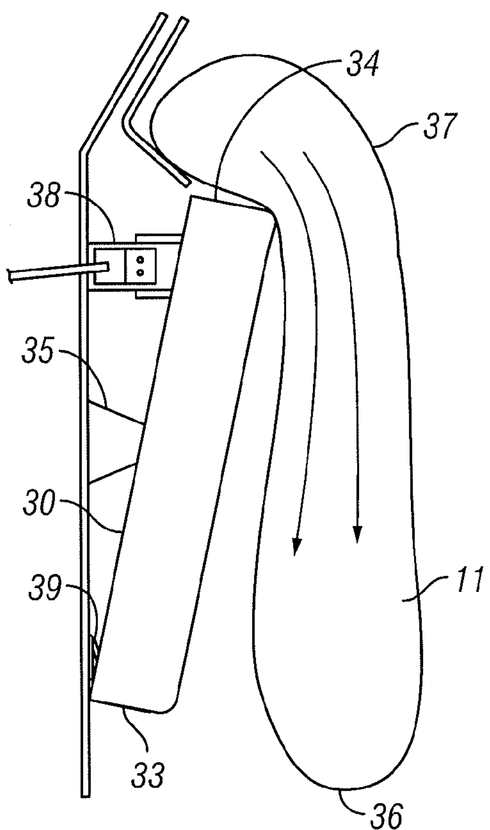
FIG. 6 is a rear elevational view of the trim panel of FIG. 4 with an upper end pivoted inboard after airbag deployment.

As shown in FIGS. 4-6, the airbag 11 includes a mounting structure 31 and a deployment apparatus 32 (FIG. 3). The mounting structure 31 fixedly attaches the airbag 11 to the roof rail structure 17 by, for example, mechanical fasteners in a conventional manner. The roof rail structure 17 includes a first elongated body structure that extends in a first direction (the vehicle longitudinal direction V). The airbag 11 extends along the roof rail structure 17 (the first elongated body structure), such that when the airbag 11 inflates and moves to the deployed orientation, the airbag 11 extends downward covering the window opening 25.

The airbag 11 can be rolled or folded accordion-style in a conventional manner when in the stowed orientation, as shown in FIG. 4. A series of retaining bands (not shown) retain the airbag 11 in the stowed orientation. The retaining bands (not shown) are frangible such that upon deployment, the airbag 11 can rapidly move to the deployed orientation shown in FIGS. 5 and 6. The deployment apparatus 32 is a conventional airbag inflation device that is connected to a sensor (not shown) that triggers the deployment apparatus 32 to rapidly inflate the airbag 11 in response to detection of an impact event.

FIGS. 5 and 6 show alternative movements of the pivotable trim panel 30 after or simultaneous with deployment of the airbag 11 from the stowed position to the deployed position to move the deployed airbag in an inboard direction. As shown in FIG. 5, a first or lower end 33 of the trim panel 30 is pivoted in the inboard direction about a pivot structure 35 to move a first or lower end 36 of the airbag 11 in the inboard direction. As shown in FIG. 6, a second or upper end 34 of the pivotable trim panel 30 is pivoted in the inboard direction about the pivot structure 35 to move a second or upper end 37 of the airbag 11 in the inboard direction. Preferably, the end of the trim panel 30 that is not pivoted in the inboard direction is pivoted in the outboard direction, as shown in FIGS. 5 and 6. The inboard movement of the trim panel 30 moves the deployed airbag 11 in the inboard direction, thereby providing an inboard reaction surface to mitigate occupant ejection.

As described in more detail below, a trim deployment structure is connected to the pillar structure and is configured to pivot the trim panel 30 about the pivot structure 35 after deployment of the airbag 11. The trim deployment structure preferably includes at least one of a push mechanism 38 and a pull mechanism 39. The push mechanism 38, such as a gas generator, is configured to move one end of the trim panel 30 in the inboard direction. The pull mechanism 39, such as a spring member, is configured to move an opposite end of the trim panel 30 in the outboard direction.

Figure 7:
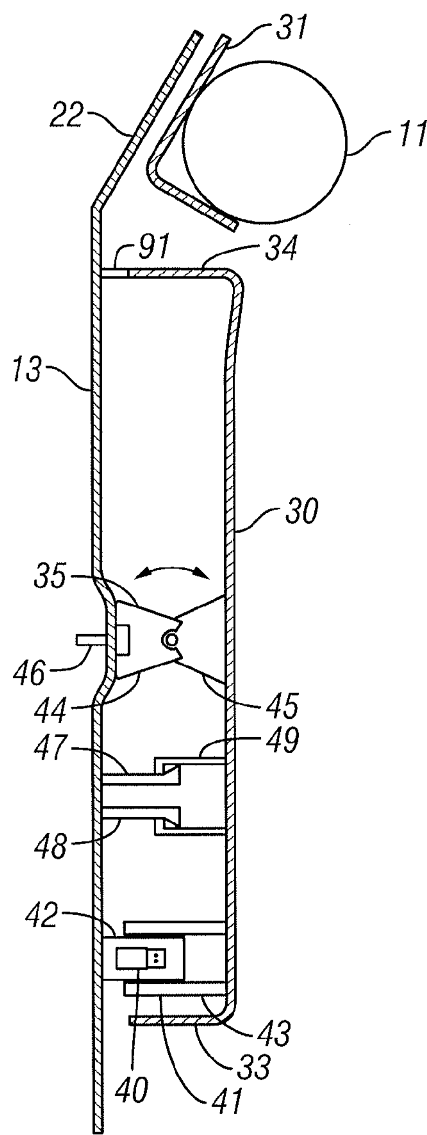
FIG. 7 is a rear elevational view in cross-section of the trim panel of FIG. 4 with a gas generator and locking member prior to airbag deployment.
Figure 8:
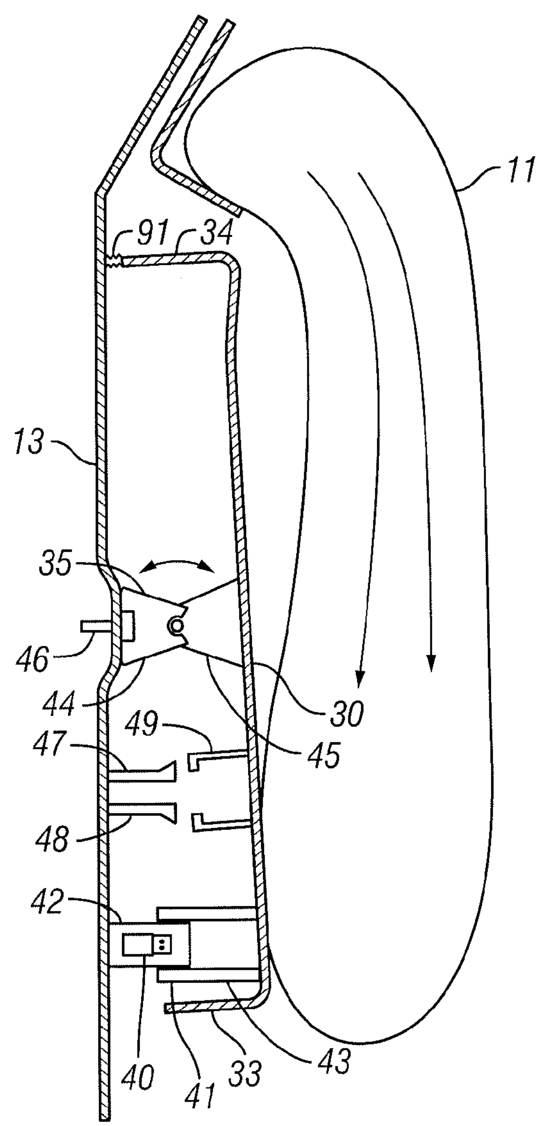
FIG. 8 is a rear elevational view in cross-section of the trim panel of FIG. 7 after airbag deployment.

In an exemplary embodiment shown in FIGS. 7 and 8, the push mechanism is a gas generator 40 disposed in a chamber 41 between the pillar structure 13 and the trim panel 30. The chamber 41 includes a first chamber 42 adjacent the pillar structure 13 and a second chamber 43 adjacent the trim panel

30. The first chamber 42 can be integrally formed with or connected to the pillar structure 13. The second chamber 43 can be integrally formed with or connected to the trim panel 30, and is preferably disposed within the first chamber 42 as shown in FIG. 7 prior to activation of the gas generator 40. The second chamber 43 is in fluid communication with the first chamber 42. The gas generator 40 is activated in any suitable manner, such as by connection to a deployment apparatus similar to deployment apparatus 32. A delay can be accommodated in the connection such that the gas generator 40 is activated after the deployment apparatus 32 deploys the airbag 11. Alternatively, the gas generator 40 and the deployment apparatus 32 can be connected to such that the gas generator 40 and the deployment apparatus 32 are activated substantially simultaneously. The gas generator 40 can be any suitable gas generator, such as, but not limited to, a pyrotechnic gas generator, such as a micro gas generator.

When the gas generator 40 is activated, as shown in FIG. 8, gas is emitted from the gas generator 40 into the second chamber 43, thereby moving the second chamber 43 with respect to the first chamber 42. As shown in FIGS. 7 and 8, the pivot structure includes a first pivot member 44 connected to the pillar structure 13 and a second pivot member 45 connected to the trim panel 30. The first pivot member 44 is rigidly connected to the pillar structure 13 in any suitable manner, such as with a fastener 46. The second pivot member 45 is rigidly connected to or integrally formed with the trim panel 30 and is pivotably connected to the first pivot member 44, such that the trim panel 30 pivots about the pivot structure 35 when the gas generator 40 is activated.

A locking structure 47 includes a first locking member 48 connected to the pillar structure 13 and a second locking member 49 connected to the trim panel 30. Prior to activation of the gas generator 40, the second locking member 49 is received by the first locking member 48, thereby further securing the trim panel 30 to the pillar structure.

Upon activation of the gas generator 40, as shown in FIG. 8, gas is emitted into the second chamber 43, thereby moving the trim panel 30 in an inboard direction. The pivotal connection between the trim panel 30 and the pillar structure 13 causes the trim panel 30 to pivot with respect to the pillar structure 13 about the pivot structure 35 when the emitted gas moves the first end 33 of the trim panel in the inboard direction. The first and second chambers 42 and 43 can be contoured or have any suitable shape to facilitate accommodating the pivotal movement of the trim panel 30 with respect to the pillar structure 13.

Figure 9:
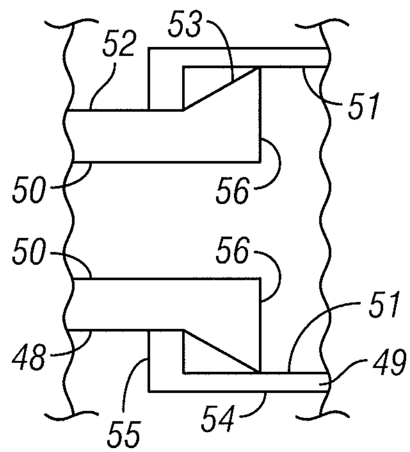
FIG. 9 is a rear elevational view of the locking member of FIG. 7 in a locked position.
Figure 10:
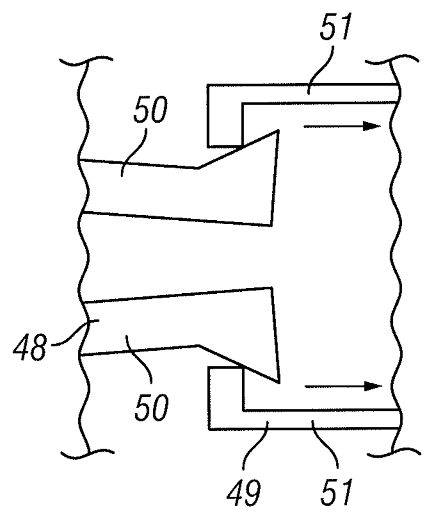
FIG. 10 is a rear elevational view of the locking member of FIG. 9 moving from the locked position to an unlocked position.
Figure 11:
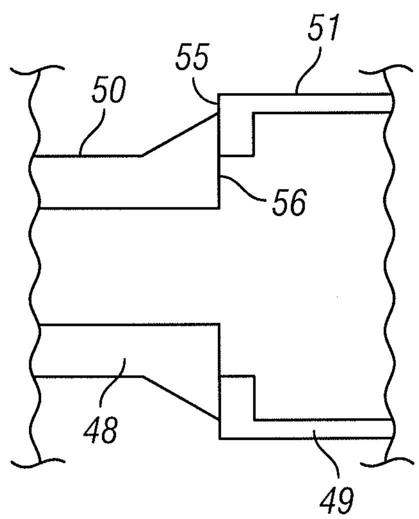
FIG. 11 is a rear elevational view of the locking member of FIG. 10 in the unlocked position.

The first locking member 48 preferably includes a pair of flexible arms 50 and the second locking member 49 preferably includes a pair of locking arms 51, as shown in FIGS. 9-11. The flexible arms 50 have a flat surface 52 extending outwardly from the pillar structure 13 and a ramped surface 53 extending outwardly from an end of the flat surface. The locking arms 51 are preferably substantially L-shaped and include a first part 54 extending outwardly from the trim panel 30 and a second part 55 extending substantially perpendicularly to the first part. Prior to activation of the gas generator 40, as shown in FIG. 9, the second parts 55 of the locking arms 51 are disposed on the flat surfaces 52 of the flexible arms 50, such that the ramped surfaces 53 prevent inboard movement of the locking arms 51. When the gas generator 40 is activated, the pressure exerted in the second chamber 43 by the emitted gas causes the second parts 55 of the locking arms 51 to slide along the ramped surfaces 53, thereby flexing the flexible arms 50 toward each other as shown in FIG. 10. As shown in FIG. 11, the locking arms 51 are released from the flexible arms 50 such that the trim panel 30 can pivot about the pivot structure 35 with respect to the pillar structure 13. The flexible arms 50 return to an unflexed condition, such that the second parts 55 of the locking arms 51 abut the free ends 56 of the flexible arms 50, thereby preventing outboard movement of the trim panel 30 due to engagement with the deployed airbag 11.

Figure 12:
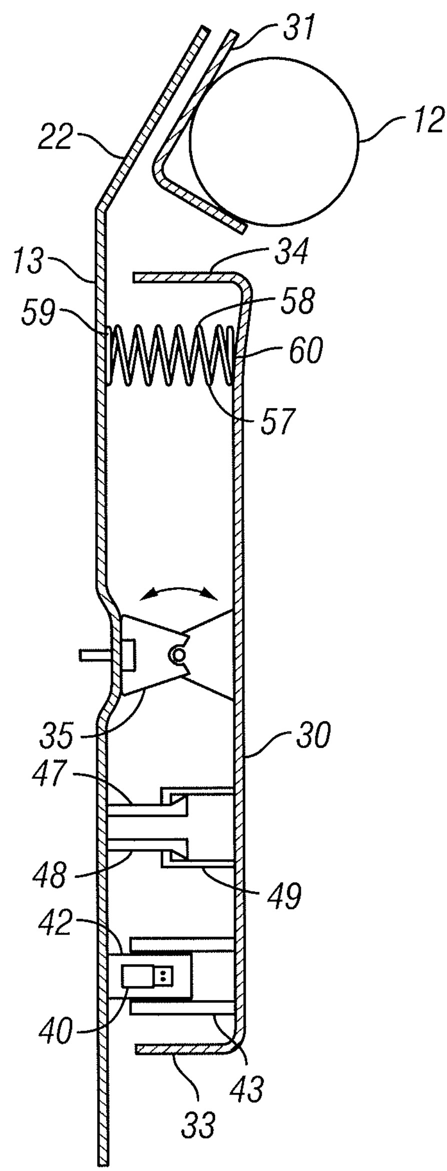
FIG. 12 is a rear elevational view of the trim panel of FIG. 7 including an assisting biasing member prior to airbag deployment.
Figure 13:
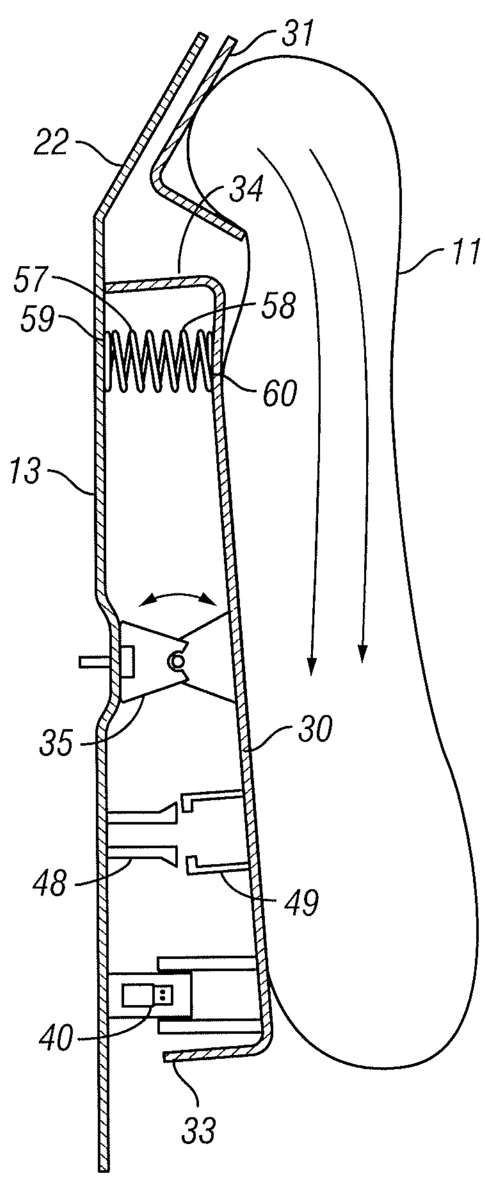
FIG. 13 is a rear elevational view of the trim panel of FIG. 12 after airbag deployment.

Another exemplary embodiment shown in FIGS. 12 and 13 is substantially similar to the exemplary embodiment shown in FIGS. 7-11, with the exception of an assisting member 57 disposed between the pillar structure 13 and the trim panel 30. The assisting member 57 can be any suitable member that facilitates moving the upper end 34 of the trim panel 30 in the outboard direction (toward the pillar structure 13), such as a compression spring 58. A first end 59 of the compression spring 58 is connected to the pillar structure 13. A second end 60 of the compression spring 58 is connected to the trim panel 30. As shown in FIG. 12, the compression spring 58 is disposed in tension between the trim panel 30 and the pillar structure 13. When the trim panel 30 pivots about the pivot structure 35, as shown in FIG. 13, the compression spring 58 compresses, thereby assisting in pivotal movement of the trim panel 30 by pulling the upper end 34 of the trim panel 30 in the outboard direction. Preferably, the assisting member 57 moves the upper end 34 of the trim panel in the outboard direction substantially immediately upon airbag deployment, thereby moving the trim panel out of the way to provide clearance for downward movement of the deployed airbag 11. The upper end 34 of the trim panel 30 can include a movable or flexible portion, such as an accordion portion 91, to accommodate outboard movement of the upper end 34 of the trim panel 30 toward the pillar structure 13.

Figure 14:
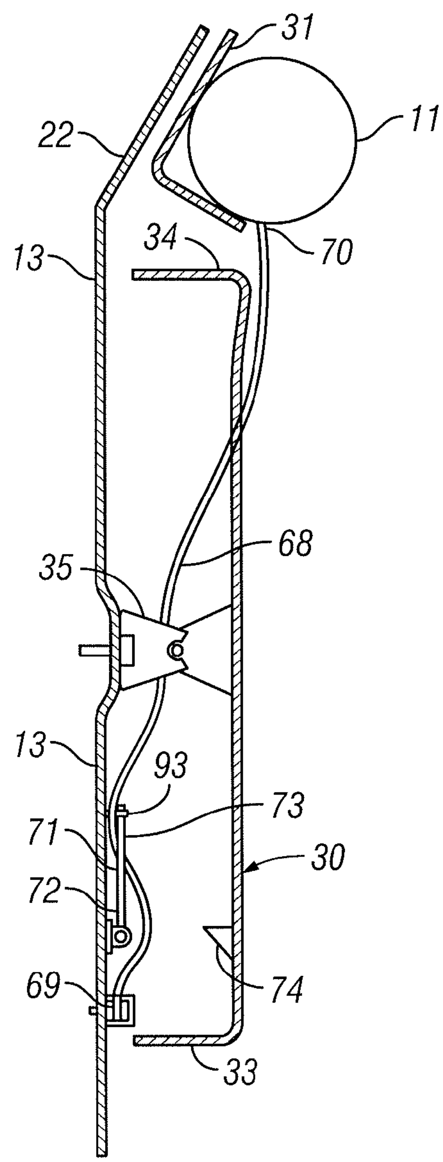
FIG. 14 is a rear elevational view in cross-section of a trim panel according to another exemplary embodiment of the present invention in which a locking bar is shown in a position prior to airbag deployment.
Figure 15:
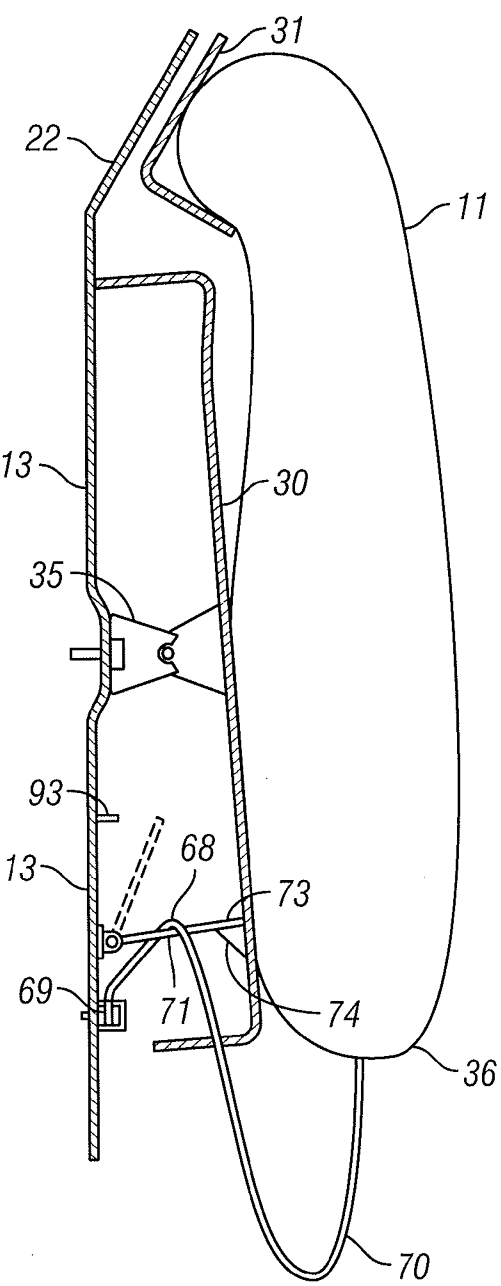
FIG. 15 is a rear elevational view in cross-section of the trim panel of FIG. 14 in which the locking bar is in a locked position after airbag deployment.

Yet another exemplary embodiment of the present invention is shown in FIGS. 14 and 15. As shown in FIG. 14, a tether 68 has a first end 69 connected to the pillar structure 13 and a second end 70 connected to the airbag 11. A first end 72 of a locking bar 71 is pivotally connected to the pillar structure 13 and a second end 73 is disposed adjacent the trim panel 30. The locking bar 71 can be connected to the pillar structure 13 in any suitable manner, such as with a retaining clip or a frangible member 93, to substantially prevent movement thereof with respect to the pillar structure prior to deployment of the airbag 11. Alternatively, the locking bar 71 can be freely disposed between the pillar structure 13 and the trim panel 30 prior to airbag deployment.

When the airbag 11 is deployed, as shown in FIG. 15, the tether 68 travels with the deployed airbag 11, such that the tether 68 engages the locking bar 71 and pivots the locking bar downwardly. The tether 68 continues to push the locking bar 71 downwardly such that the free end 73 of the locking bar 71 engages the trim panel 30, as shown in FIG. 15, and pivots the trim panel 30 about the pivot structure 35. The tether 68 pivots the locking bar 71 until the locking bar engages a projection 74 connected to the trim panel 30, thereby preventing further movement of the locking bar 71. The locking bar 71 locks the trim panel 30 in the pivoted position shown in FIG. 15 such that the deployed airbag 11 and contact therewith does not pivot the trim panel outboardly (toward the pillar structure 13).

Figure 17:
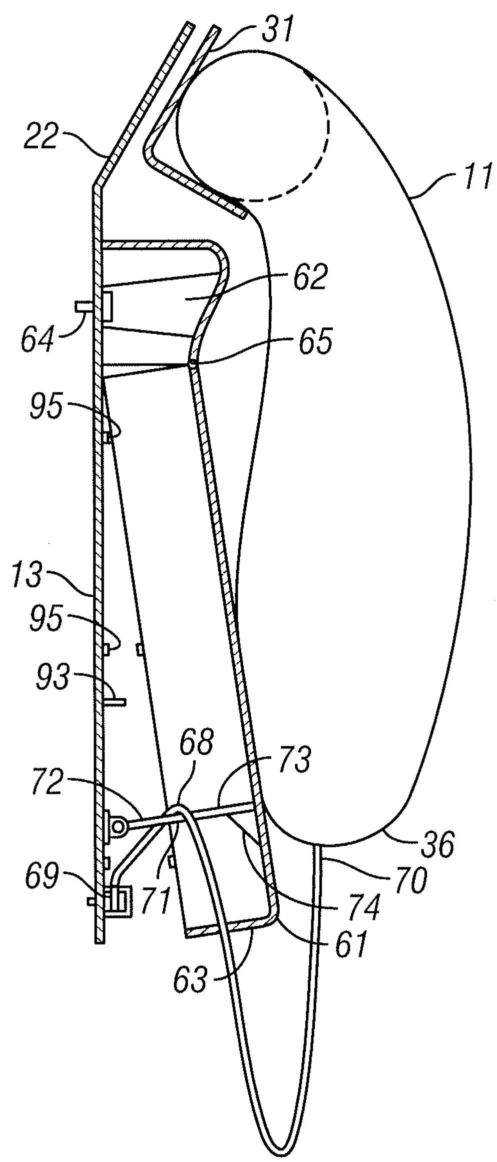
FIG. 17 is a rear elevational view in cross-section of the trim panel of FIG. 16 in which the locking bar is in a locked position after airbag deployment.

Another exemplary embodiment shown in FIGS. 16 and 17 is substantially similar to the exemplary embodiment shown in FIGS. 14 and 15 except as described hereinafter. A two-piece trim panel 61 is pivotally connected to the pillar structure 13. The trim panel 61 includes a stationary part 62 connected to the pillar structure 13 in any suitable manner, such as with a fastener 64, such that the stationary part does not move relative to the pillar structure 13. A movable part 63 of the trim panel 61 is movably connected to the stationary part 62 such that the movable part 63 is movable relative to the stationary part 62. The movable part 63 is connected to the stationary part in any suitable manner, such as with a hinge 65 or a living hinge. Side edges 66 and lower edge 67 of the movable part 63 of the trim panel 61 can be connected to the pillar structure by frangible members 95 configured to break when the movable part 63 moves with respect to the stationary part 62, as shown in FIG. 16.

Accordingly, the exemplary embodiments of the present invention facilitate pivoting the trim panel about a pivot structure with respect to the pillar structure, such that an end of the trim panel is pushed in the inboard direction to engage a deployed airbag. An assisting member can be included to further facilitate pushing the trim panel in the inboard direction by pulling an opposite end of the trim panel in the outboard direction. A locking structure can be provided to substantially prevent the pivoted trim panel from moving in the outboard direction.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle body structure, comprising:

a roof structure;

a pillar structure extending below the roof structure;

an airbag mounted to and extending along the roof structure, the airbag being deployable from a stowed orientation to a deployed orientation;

a trim panel mounted to and extending along the pillar structure, the trim panel being disposed beneath the airbag when the airbag is in the stowed orientation, and the airbag overlaying the trim panel when the airbag is in the deployed orientation;

a pivot structure; and a trim deployment structure connected to the pillar structure, the trim deployment structure being configured to pivot the trim panel about the pivot structure after deployment of the airbag to the deployed orientation such that the trim panel engages the deployed airbag to move the deployed airbag in an inboard direction.

2. The vehicle body structure according to claim 1, wherein the trim deployment structure comprises at least one of a push mechanism configured to move the trim panel in the inboard direction and a pull mechanism configured to move the trim panel in an outboard direction.

3. The vehicle body structure according to claim 2, wherein the trim deployment structure includes a gas generator that pivots the trim panel about the pivot structure upon activation of the gas generator.

4. The vehicle body structure according to claim 3, wherein the trim deployment structure defines a chamber including a first chamber portion disposed adjacent to the pillar structure and a second chamber portion disposed adjacent to the trim panel, with the first chamber portion being nested in the second chamber portion prior to activation of the gas generator, and the first chamber portion remaining stationary and the second chamber portion moving inboard relative to the first chamber portion in response to activation of the gas generator.

5. The vehicle body structure according to claim 3, wherein a locking structure secures the trim panel to the pillar structure prior to the trim panel being moved upon activation of the gas generator, the locking structure includes a first locking member connected to the pillar structure and a second locking member connected to the trim panel, the second locking member is configured to disengage the first locking member when the trim panel is moved upon activation of the gas generator.

6. The vehicle body structure according to claim 5, wherein the first locking member includes a pair of flexible arms configured to flex inwardly to release the second locking member when the trim panel is pivoted upon activation of the gas generator, and configured to return to an unflexed condition such that the flexible arms abut the second locking member to prevent outboard movement of the second locking member.

7. The vehicle body structure according to claim 1, wherein the trim deployment structure comprises a push mechanism configured to move the trim panel in the inboard direction and a pull mechanism configured to move the trim panel in an outboard direction, the push mechanism and the pull mechanism being disposed on opposite sides of the pivot structure.

8. The vehicle body structure according to claim 1, wherein a bottom end of the trim panel moves in the inboard direction.

9. The vehicle body structure according to claim 1, further comprising an upper end of the trim panel moves in the inboard direction.

10. The vehicle body structure according to claim 1, further comprising a biasing member disposed between the pillar structure and the trim panel in tension such that the biasing member compresses when the trim panel pivots to facilitate pivotal movement thereof, wherein the trim deployment structure is disposed on a first side of the pivot structure, and the biasing member is disposed on a second side of the pivot structure opposite the first side.

11. The vehicle body structure according to claim 1, further comprising a tether having an airbag end fixed to the airbag and an anchor end fixed to the pillar structure, wherein the trim deployment structure includes a locking bar movable between an unlocked position and a locked position, the tether extending between the locking bar and the pillar structure such that deployment of the airbag causes the tether to move the locking bar from the unlocked position to the locked position.

12. The vehicle body structure according to claim 11, further comprising a protrusion disposed on an inner surface of the trim panel configured to engage the locking bar in the locked position to prevent movement of the locking bar beyond the protrusion.

13. The vehicle body structure according to claim 1, wherein the pivot structure is disposed between the pillar structure and the trim panel.

14. The vehicle body structure according to claim 1, wherein the trim panel includes a top portion and a bottom portion, and the pivot structure pivotally couples the bottom portion to the top portion such that the top portion remains stationary, and the bottom portion moves relative to the top portion to engage the deployed airbag.

15. A vehicle body structure, comprising:

a roof structure;

a pillar structure extending below the roof structure;

an airbag mounted to and extending along the roof structure, the airbag being deployable from a stowed orientation to a deployed orientation;

a trim panel mounted to and extending along the pillar structure, the trim panel being disposed beneath the airbag when the airbag is in the stowed orientation, and the airbag overlaying the trim panel when the airbag is in the deployed orientation;

a pivot structure pivotally securing the trim panel to the pillar structure, the pivot structure being positioned between an upper portion of the trim panel and a lower portion of the trim panel; and a trim deployment structure connected to the pillar structure and disposed below the pivot structure, the trim deployment structure being configured to pivot the trim panel about the pivot structure after deployment of the airbag to the deployed orientation such that the bottom portion of the trim panel moves in an inboard direction and engages the deployed airbag to move the deployed airbag in the inboard direction.

16. The vehicle body structure according to claim 15, wherein the trim deployment structure includes a gas generator which pivots the trim panel about the pivot member upon activation of the gas generator.

17. The vehicle body structure according to claim 16, wherein the trim deployment structure defines a chamber including a first chamber portion disposed adjacent to the pillar structure and a second chamber portion disposed adjacent to the trim panel, the first chamber portion being nested in the second chamber portion prior to activation of the gas generator, and the first chamber portion remaining stationary and the second chamber portion moving inboard relative to the first chamber portion in response to activation of the gas generator.

18. The airbag assembly according to claim 15, further comprising a biasing member disposed above the pivot structure and between the pillar structure and the trim panel in tension such that the biasing member compresses when the trim panel pivots to facilitate pivotal movement thereof.

19. The vehicle body structure according to claim 15, further comprising a tether having an airbag end fixed to the airbag and an anchor end fixed to the pillar structure, wherein the trim deployment structure includes a locking bar movable between an unlocked position and a locked position, the tether extending between the locking bar and the pillar structure such that deployment of the airbag causes the tether to move the locking bar from the unlocked position to the locked position; and a protrusion disposed on an inner surface of the trim panel configured to engage the locking bar in the locked position to prevent movement of the locking bar beyond the protrusion.

20. A vehicle body structure, comprising:

a roof structure;

a pillar structure extending below the roof structure;

an airbag mounted to and extending along the roof structure, the airbag being deployable from a stowed orientation to a deployed orientation;

a trim panel mounted to and extending along the pillar structure, the trim panel being disposed beneath the airbag when the airbag is in the stowed orientation, and the airbag overlaying the trim panel when the airbag is in the deployed orientation;

a pivot structure; and a trim deployment structure connected to the pillar structure, the trim deployment structure being configured to pivot the trim panel about the pivot structure after deployment of the airbag to the deployed orientation such that the trim panel engages the deployed airbag to move the deployed airbag in an inboard direction, the trim deployment structure including at least one of a push mechanism configured to move the trim panel in the inboard direction and a pull mechanism configured to move the trim panel in an outboard direction, the trim deployment structure including a gas generator configured to pivot the trim panel about the pivot structure upon activation of the gas generator, the gas generator defining a chamber including a first chamber portion disposed adjacent to the pillar structure and a second chamber portion disposed adjacent to the trim panel, with the first chamber portion being nested in the second chamber portion prior to activation of the gas generator, and the first chamber portion remaining stationary and the second chamber portion moving inboard relative to the first chamber portion in response to activation of the gas generator.

* * * * *